Dec. 22, 1931. H. A. MEDIN 1,837,368
MACHINE FOR MAKING INFUSIONS OF COFFEE AND OTHER MATERIAL
Original Filed April 9, 1928  3 Sheets-Sheet 2

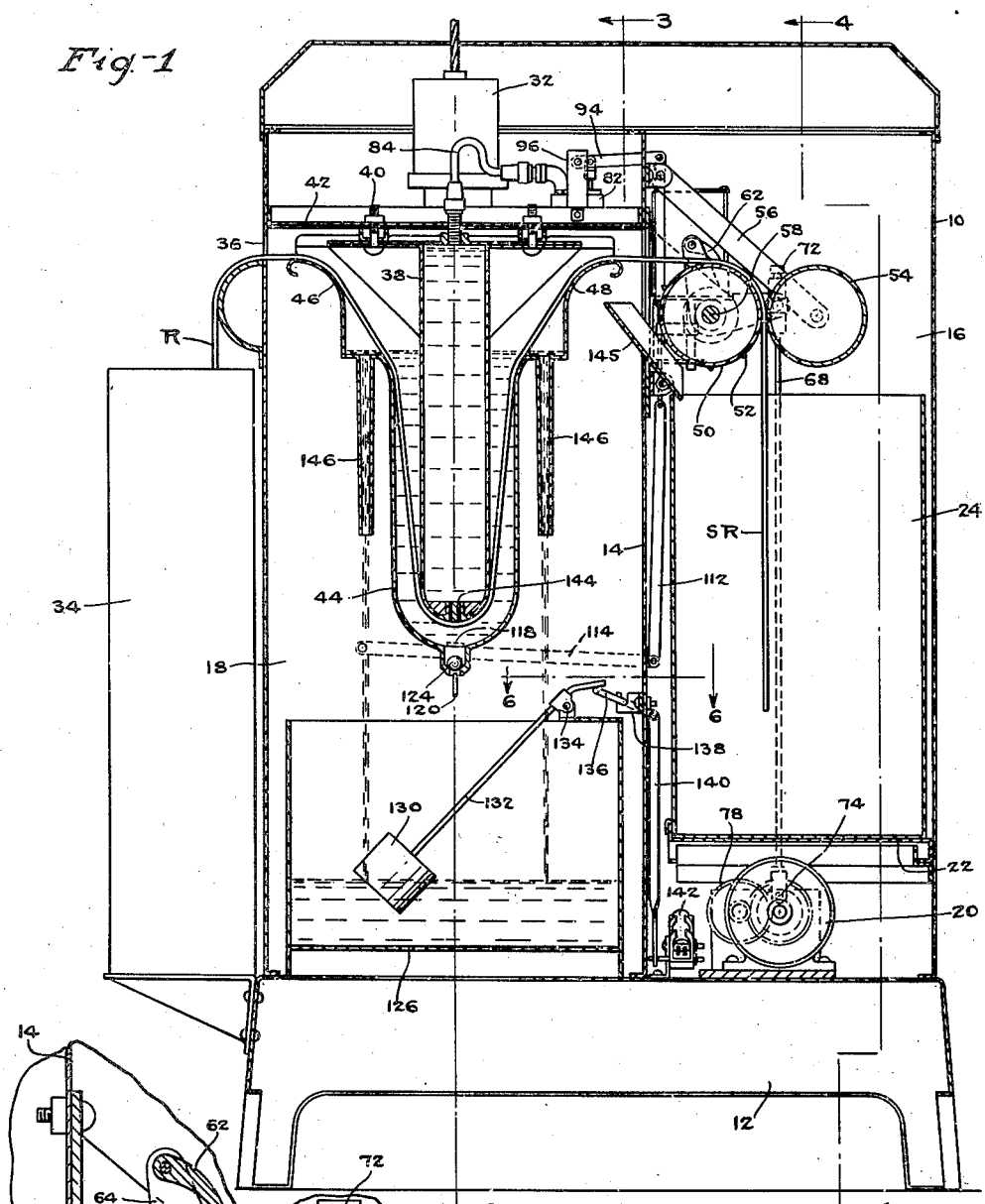

Inventor:
Harry A. Medin.
By Whiteley and Ruckman
Attorneys.

Dec. 22, 1931.  H. A. MEDIN  1,837,368
MACHINE FOR MAKING INFUSIONS OF COFFEE AND OTHER MATERIAL
Original Filed April 9, 1928   3 Sheets-Sheet 3
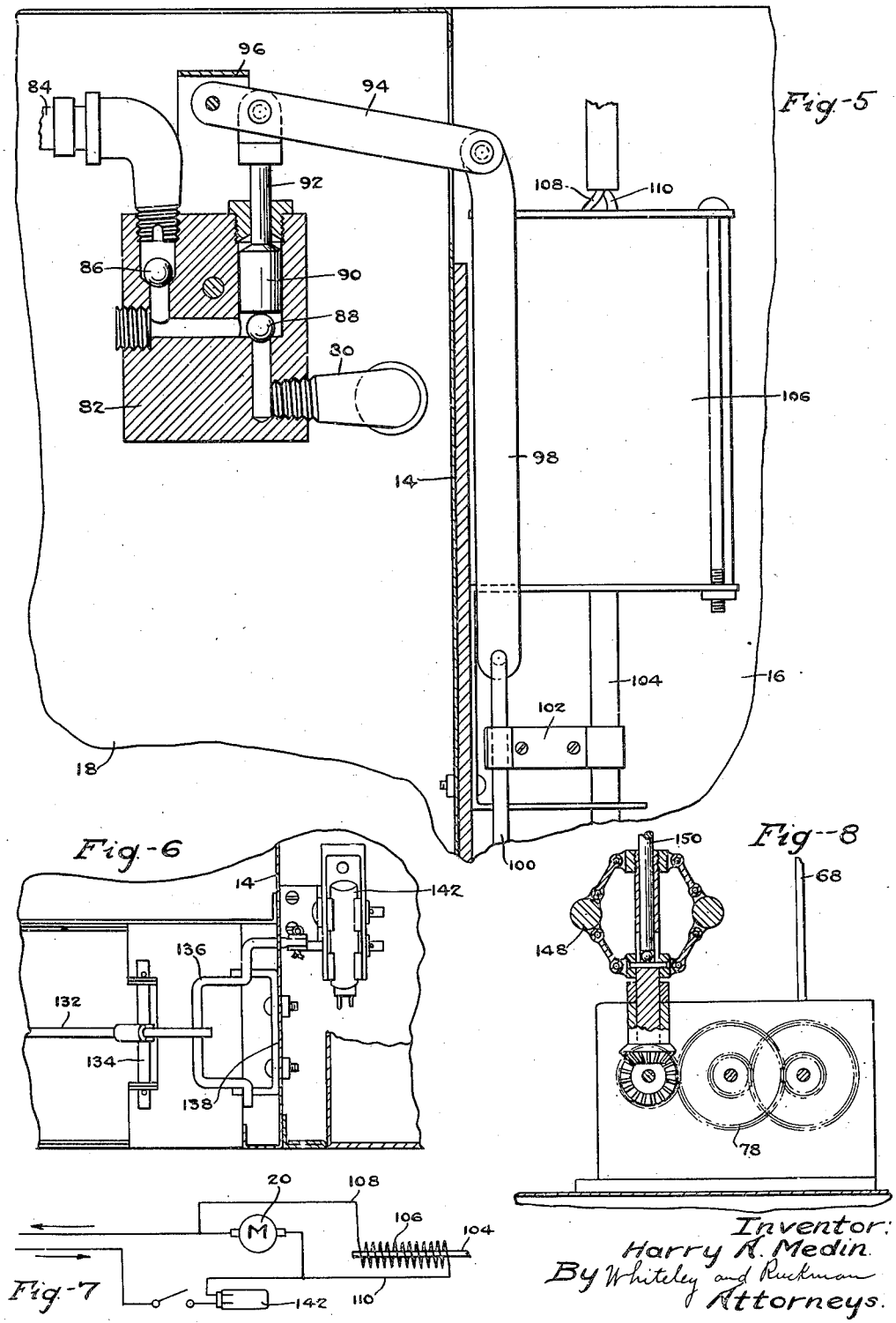

Patented Dec. 22, 1931

1,837,368

UNITED STATES PATENT OFFICE

HARRY A. MEDIN, OF MINNEAPOLIS, MINNESOTA

MACHINE FOR MAKING INFUSIONS OF COFFEE AND OTHER MATERIAL

Application filed April 9, 1928, Serial No. 268,400. Renewed August 19, 1929.

My invention relates to machines for making infusions of coffee and other material, and an object is to provide a machine which will feed coffee or other material in ribbonlike form and progressively subject the ribbon to the action of hot water or other infusing agent. While intended more particularly for making coffee infusions, it will be obvious that the machine may be used for making infusions of other material such as tea, beef tea extract, etc. A further object of the invention is to provide a machine of this character which is automatically stopped and started according to the amount of the infusion which has been stored up and which is being used so that a supply of the infusion will always be on hand for serving as long as it is desired to have the operation continued.

The full objects and advantages of my invention will appear in connection with the detailed description thereof, and the novel features of my inventive idea will be particularly pointed out in the claims.

Figure 3:
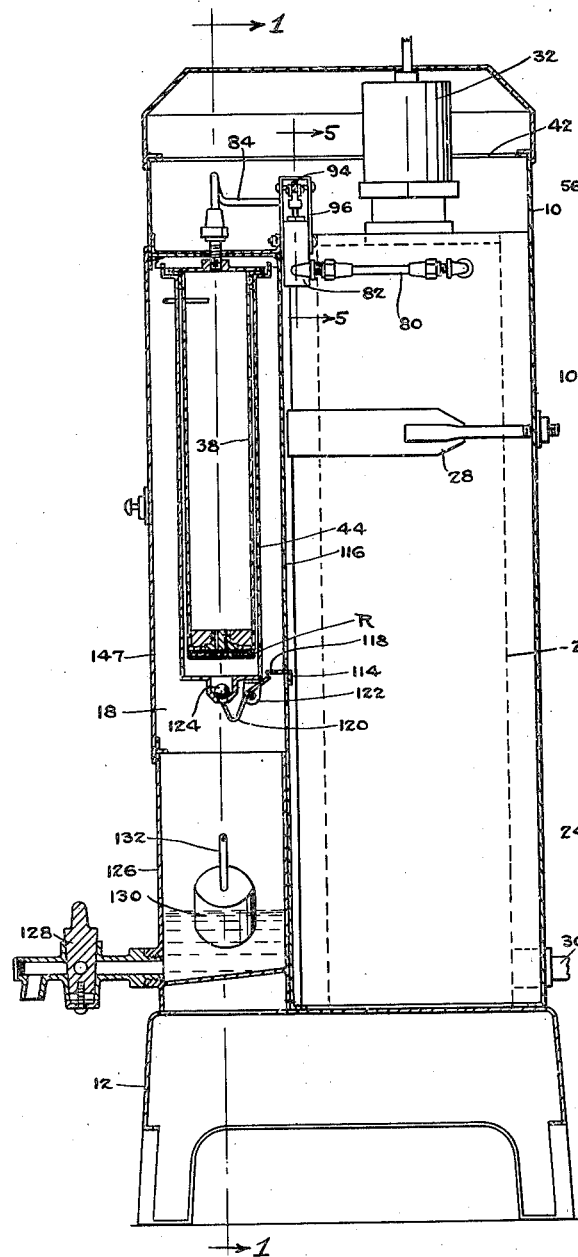
Figure 4:
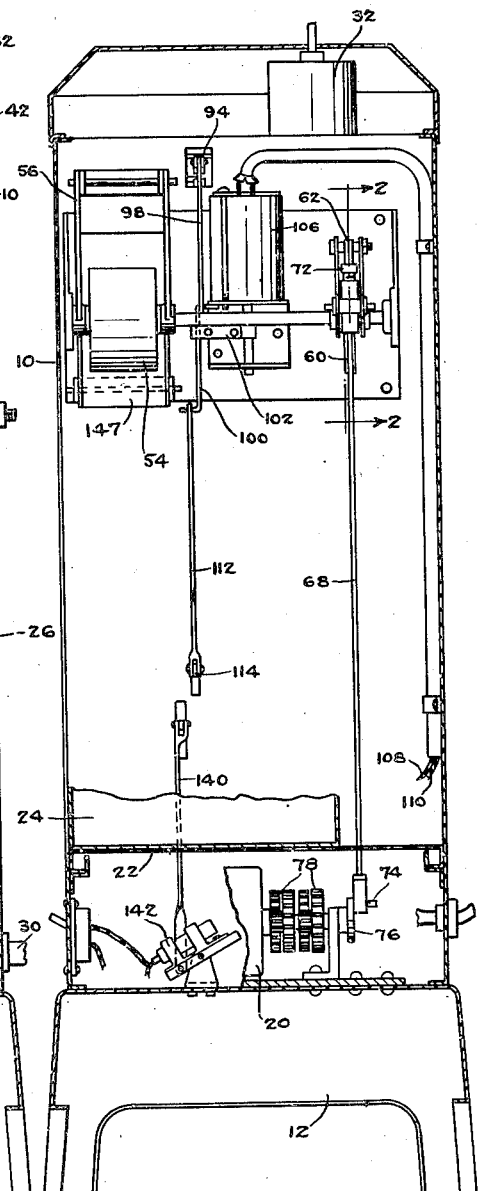

In the accompanying drawings which illustrate a practical embodiment of my invention, Fig. 1 is a view of the machine in vertical section on the line 1—1 of Fig. 3. Fig. 2 is a view in vertical section on the line 2—2 of Fig. 4. Fig. 3 is a view in vertical section on the line 3—3 of Fig. 1. Fig. 4 is a view in vertical section on the line 4—4 of Fig. 1. Fig. 5 is a view on an enlarged scale in vertical section on the line 5—5 of Fig. 3. Fig. 6 is a view on an enlarged scale in horizontal section on the line 6—6 of Fig. 1. Fig. 7 is a wiring diagram view. Fig. 8 is a view in vertical section of a modified form of governor.

Referring to the construction shown in the drawings, the numeral 10 designates a casing of suitable sheet material which has a supporting base 12. The casing 10 contains a vertical partition 14 which extends between the front and rear walls thereof so as to produce two compartments 16 and 18. In the bottom of the compartment 16, there is an electric motor 20 which will be referred to more particularly later. Above this motor there is a shelf 22 which supports a receptacle 24 as shown in Fig. 1. In the compartment 18, there is a water tank 26 held in place by a strap 28 while a pipe 30 leading into the tank from any suitable source of water supply serves to keep the tank filled with water. The water in the tank 26 is heated in any suitable manner and as shown, I have provided a terminal connection 32 for an electric heating element which extends down into the tank. The machine is designed to feed a ribbon of coffee such as that disclosed in my prior application Serial Number 208,169 filed July 25, 1927, in which there is described and shown a flat casing of fabric containing a filling of ground coffee. The ribbon may be supplied to the machine in any suitable manner and as shown in Fig. 1, I provide a can 34 for containing the ribbon R, this can being attached at one side of the casing 10. The ribbon passes through an opening 36 near the top of the casing. A hollow member 38 is secured by bolts 40 to a shelf 42 extending across the casing at a level above the opening 36. Surrounding and spaced outwardly from the hollow member 38, there is a larger hollow member 44 which at its upper end adjacent the opening 36 has a curved guide 46. At the opposite side of the member 44, there is a curved guide 48. The ribbon passes over the guide 46, down under the lower end of the member 38 and up over the guide 48. It then passes through an opening in the partition 14 and down over a feed roller 50 provided with points 52 for engaging the ribbon. The ribbon is held against the roller 50 by an abutment such as an idle roller 54 carried by a swinging support 56, pivotally attached at its upper end to the partition 14. In order to drive the feed roller 50, its shaft 58 has secured thereto a ratchet wheel 60 best shown in Fig. 2. Engaging the ratchet wheel 60, there is a pawl 62 which is pivoted on the upper end of a bell crank 64 whose other end is provided with an internally threaded sleeve 66. A rod 68 passes slidably through an opening in the lower wall of the sleeve 66 and the upper end of this rod has a head 70 located inside the sleeve. A screw plug 72 threaded into this sleeve determines the amount of loose motion which the head 70 can have in the sleeve. The more the plug 72 is turned down, the greater will be the swinging movement which is imparted to the pawl 62. When the rod 68 is reciprocated, the feed roller 50 will be rotated step by step and to an extent determined by the position of the plug 72. The lower end of the rod 68 is attached to a crank pin 74 secured to a disk 76 operated by reduction gearing 78 driven by the motor 20. The spent ribbon SR which passes over the feed roller 50 is received in the receptacle 24. The top of the hot water tank 26 is connected by a pipe 80 with a valve casing 82 best shown in Fig. 5 and this casing is connected by a pipe 84 with the top of the hollow member 38. The casing 82 is provided with a backwardly closing checkvalve 86. The casing 82 is also provided with a ball valve 88 which is held firmly in closed position when a plunger 90 is in engagement with the upper side thereof. This plunger and valve therefore constitute a shut-off device with regard to passage of water into the hollow member 38. The plunger 90 has a stem 92 which is attached to a lever 94 pivoted at one end to an inverted U-shaped support 96 carried by the valve casing 82. A bar 98 is attached to the other end of the lever 94 and the lower end of the lever 98 is attached to a rod 100 secured by a clamping bar 102 to a solenoid core 104 of a solenoid member 106 whose coil is connected by wires 108 and 110 across the motor 20 as will be understood from Fig. 7. The rod 100 is connected by a bar 112 to one end of an arm 114 pivotally attached at its other end to a vertical plate 116 located in the compartment 18 and positioned between the water tank 26 and the hollow member 44. The arm 114 carries a projection 118 which passes through a slot in the plate 116. The projection 118 is adapted to engage one end of a bent lever 120 intermediately pivoted to an ear 122 carried by the hollow member 44. The other end of the lever 120 is adapted to move up through an opening in the reduced lower end of the member 44 which opening is closed by a ball valve 124 when the arm 114 is in raised position. It will be understood that when the solenoid 106 is deenergized, the arm 114 drops and lifts the valve 124. Beneath the hollow member 44 there is a receptacle 126 provided with a draw-off faucet 128. The receptacle 126 contains a float 130 carried by one end of an arm 132 intermediately pivoted at 134. The other end of the arm 132 engages one end of a U-shaped lever 136 intermediately pivoted to a support 138 carried by the partition 14. The lever 136 is pivotally attached to the upper end of a bar 140 whose lower end is pivotally attached to a mercury switch 142 of well known construction placed in the circuit of the motor 20. When the float 130 is lifted by the rise of liquid in the receptacle, the switch 142 is rocked so as to open the switch 142 and thereby stop the motor. The lower end of the hollow member 38 is provided with a number of small perforations 144 for discharging hot water into the outer member 44 and upon the ribbon R therein. The upper portion of the member 44 is provided with tubes 146 extending downwardly for discharging the impregnated liquid into the receptacle 126. A chute 145 is attached to the partition 14 for carrying drip into the waste receptacle 24. The front of the casing 10 is provided with a door 147 for exposing the member 44 to view and this member as well as the receptacle 126 may be constructed of glass such as pyrex in order that the amount of liquid therein may be readily observed. Fig. 8 shows a slight modification in which the solenoid 106 and parts associated therewith are replaced by a centrifugal governor 148 operatively associated with a vertical rod 150 which replaces the bar 98, rod 100, and bar 112, it being understood as a matter of course that the arm 94 and the arm 114 are pivotally attached to the rod 150. The governor 148 is operated through the gearing 78 driven by the motor 20 so that when the motor is started the rod 150 is lifted by the action of the governor. This movement lifts the arm 114 which has been holding the valve 124 in open position and also lifts the plunger 90 which has been holding the valve 88 in closed position.

The operation of the machine may now be summarized. The ribbon R is threaded under the member 38 and its forward end is engaged with the feed roller 50. The motor is started by means of any customary switch in the circuit thereof. Upon starting the motor, the solenoid 106 is energized thereby lifting the plunger 90 which has been holding the valve 88 down in closed position. The pressure of the water in the hot water tank 26 now causes the water to pass this valve so that hot water is discharged through the perforations 144 upon the ribbon R and into the outer member 44. At the same time, the energization of the solenoid causes the arm 114 to be lifted so that the valve 124 is free to drop into closed position. When the member 44 becomes nearly filled with the impregnated liquid, this liquid overflows through the tubes 146 into the receptacle 126 from which it is withdrawn as desired by opening the faucet 128. The ribbon is fed intermittently by the roller 50 once every five seconds as the machine is now designed. The extent of feeding movement of the ribbon is determined by the setting of the plug 72. When the receptacle 126 has become nearly filled, the float 130 has been lifted sufficiently to rock the mercury switch and stop the motor thereby also stopping the feed of the ribbon. At the same time, the valve 124 is lifted thereby discharging the liquid in the member 44 into the receptacle 126 and the valve 88 is held closed so that no more water can pass into the member 38 until the operation is again started. When the receptacle 126 has been partly emptied, the lowering of the float 130 permits the mercury switch to swing into closed position so that the infusing operation is again started.

I claim:

1. In a machine for making infusions of coffee and other material, the combination of a source of supply of an infusing agent, mechanism for feeding a ribbon of the material to be infused, mechanism for causing the infusing agent to be delivered upon said ribbon, a receptacle into which the infusion is delivered, and mechanism for causing said feeding mechanism and said infusing agent delivering mechanism to stop when the level of the infusion in said receptacle rises and to start when the level falls.

2. In a machine for making infusions of coffee and other material, the combination of a source of supply of an infusing agent, a roller for feeding a ribbon of the material to be infused, a motor, connections between said motor and roller for driving the latter, mechanism adapted to cause the infusing agent to be delivered upon said ribbon, a shut-off for said mechanism, and mechanism for stopping said motor and closing said shut-off when the quantity of the infusion exceeds a predetermined amount and for starting said motor and opening said shut-off when the quantity of the infusion falls below a predetermined amount.

3. In a machine for making infusions of coffee and other material, the combination of a source of supply of an infusing agent, a roller for feeding a ribbon of the material to be infused, a motor, connections between said motor and roller for driving the latter step by step, a governing device operated by said motor, mechanism adapted to cause the infusing agent to be delivered upon said ribbon, a shut-off for said mechanism, mechanism for stopping said motor when the quantity of the infusion exceeds a predetermined amount and for starting said motor when the quantity of the infusion falls below a predetermined amount, and connections between said governing device and shut-off whereby the latter is closed when the motor is stopped and opens when the motor is running.

4. In a machine for making infusions of coffee and other material, the combination of a source of supply of an infusing agent, mechanism for feeding a ribbon of the material to be infused, mechanism for causing the infusing agent to be delivered upon said ribbon, a receptacle into which the infusion is delivered, a float in said receptacle, and connections between said float and said feeding mechanism which cause the latter to stop when the level of the infusion in said receptacle rises and to stop when the level falls.

5. In a machine for making infusions of coffee and other material, the combination of a tank containing water under an effective head, a heating device for said tank, mechanism for feeding a ribbon of the material to be infused, a hollow member connected to said tank and underneath which said ribbon passes, said hollow member having perforations for delivering water upon said ribbon, a second hollow member around said first hollow member and spaced therefrom, said second hollow member being open at its top for passage of said ribbon downwardly and upwardly therein, a valve in the bottom of said second hollow member, and mechanism associated with said valve whereby it is closed when said feeding mechanism is operating and is opened when said feeding mechanism is stopped.

6. In a machine for making infusions of coffee and other material, the combination of a tank containing water under an effective head, a heating device for said tank, mechanism for feeding a ribbon of the material to be infused, a hollow member connected to said tank and underneath which said ribbon passes, said hollow member having perforations for delivering water upon said ribbon, a second hollow member around said first hollow member and spaced therefrom, said second hollow member being open at its top for passage of said ribbon downwardly and upwardly therein, a valve in the bottom of said second hollow member, mechanism associated with said valve whereby it is closed when said feeding mechanism is operating and is opened when said feeding mechanism is stopped, a receptacle underneath said second hollow member, and overflow tubes extending from near the top of said second member down toward said receptacle.

In testimony whereof I hereunto affix my signature.

HARRY A. MEDIN.